United States Patent
Berard et al.

(10) Patent No.: US 8,094,976 B2
(45) Date of Patent: Jan. 10, 2012

(54) ONE-SCREEN RECONCILIATION OF BUSINESS DOCUMENT IMAGE DATA, OPTICAL CHARACTER RECOGNITION EXTRACTED DATA, AND ENTERPRISE RESOURCE PLANNING DATA

(75) Inventors: Jean-Jacques Berard, Villeurbanne (FR); Nicolas Perotin, Villeurbanne (FR)

(73) Assignee: Esker, Inc., Madison, WI (US)

( * ) Notice: Subject to any disclaimer, the term of this patent is extended or adjusted under 35 U.S.C. 154(b) by 1127 days.

(21) Appl. No.: 11/866,428

(22) Filed: Oct. 3, 2007

(65) Prior Publication Data

US 2009/0092318 A1 Apr. 9, 2009

(51) Int. Cl.
*G06K 7/10* (2006.01)

(52) U.S. Cl. ......................................... 382/321
(58) Field of Classification Search .................. 382/321
See application file for complete search history.

(56) References Cited

U.S. PATENT DOCUMENTS

| | | | |
|---|---|---|---|
| 5,031,223 A * | 7/1991 | Rosenbaum et al. | 382/101 |
| 5,060,980 A * | 10/1991 | Johnson et al. | 283/70 |
| 5,140,650 A | 8/1992 | Casey et al. | |
| 5,293,429 A | 3/1994 | Pizano et al. | |
| 5,317,646 A | 5/1994 | Sang, Jr. et al. | |
| 5,369,508 A * | 11/1994 | Lech et al. | 358/462 |
| 5,721,940 A * | 2/1998 | Luther et al. | 715/200 |
| 5,850,490 A | 12/1998 | Johnson | |
| 6,049,637 A * | 4/2000 | Kosarew et al. | 382/321 |
| 6,351,574 B1 * | 2/2002 | Yair et al. | 382/321 |
| 6,353,840 B2 * | 3/2002 | Saito et al. | 715/202 |
| 6,400,845 B1 * | 6/2002 | Volino | 382/176 |
| 6,459,953 B1 * | 10/2002 | Connelly et al. | 700/224 |
| 6,662,180 B1 * | 12/2003 | Aref et al. | 1/1 |

(Continued)

FOREIGN PATENT DOCUMENTS

WO 98/47098 A1 10/1998

(Continued)

OTHER PUBLICATIONS

Digital Invoice processing, http://www.odt-oce.com/english/products/invoicecenter_capture.asp, Oct. 2, 2007, pp. 1-2.*

(Continued)

*Primary Examiner* — Jayesh A Patel

(74) *Attorney, Agent, or Firm* — Michael Best & Friedrich LLP

(57) ABSTRACT

Systems and methods of reconciling data from an imaged document. In one embodiment, a business document is scanned to create a business document image. A set of extracted data is extracted from the business document image via optical character recognition (OCR). The set of OCR extracted data is then compared with data in business information management or enterprise resource planning (ERP) system. A set of ERP data is retrieved from the ERP system that relates to the set of OCR extracted data. The retrieved ERP data is than assigned to the set of OCR extracted data to create a set of assigned data. The business document image is then displayed in a business document image pane, the set of OCR extracted data is displayed in the OCR data pane, and the retrieved ERP data is displayed in the ERP data pane. The set of assigned data is validated, and the ERP system is updated with the set of validated, assigned data. In other embodiments, data is extracted from text files without using OCR.

11 Claims, 13 Drawing Sheets

U.S. PATENT DOCUMENTS

| | | | |
|---|---|---|---|
| 6,987,863 B2 * | 1/2006 | Rauh et al. | 382/101 |
| 7,046,848 B1 * | 5/2006 | Olcott | 382/176 |
| 7,305,612 B2 * | 12/2007 | Chakraborty | 715/221 |
| 7,570,842 B2 * | 8/2009 | Suenaga et al. | 382/321 |
| 7,668,407 B1 * | 2/2010 | Baker et al. | 382/321 |
| 7,711,191 B2 * | 5/2010 | Kosek et al. | 382/181 |
| 7,971,139 B2 * | 6/2011 | Stanciu et al. | 715/237 |
| 2004/0255218 A1 * | 12/2004 | Tada et al. | 714/747 |
| 2004/0260636 A1 * | 12/2004 | Marceau et al. | 705/35 |
| 2005/0027551 A1 * | 2/2005 | Mayer et al. | 705/1 |
| 2005/0131751 A1 | 6/2005 | Ahlers et al. | |
| 2005/0289182 A1 * | 12/2005 | Pandian et al. | 707/104.1 |
| 2006/0007198 A1 * | 1/2006 | Gilbert | 345/204 |
| 2007/0143736 A1 | 6/2007 | Moriarty et al. | |
| 2008/0285792 A1 * | 11/2008 | Comay | 382/100 |
| 2009/0110279 A1 * | 4/2009 | Jain et al. | 382/176 |
| 2010/0010873 A1 * | 1/2010 | Moreau | 705/10 |

FOREIGN PATENT DOCUMENTS

| | | |
|---|---|---|
| WO | WO 9847098 * | 10/1998 |
| WO | 01/63467 A1 | 8/2001 |

OTHER PUBLICATIONS

Digital Invoice Processing (Invoice Capturing). Oce Portfolio. Retrieved from www.odt-oce.com/english/products/invoicecenter_capture.asp on Oct. 2, 2007.

Ebydos: Invoice Cockpit. Retrieved from www.ebydos.com/files/pdf/Ebydos_FS_Cockpit_us.pdf on Oct. 2, 2007.

* cited by examiner

Fig. 5

ONE-SCREEN RECONCILIATION OF BUSINESS DOCUMENT IMAGE DATA, OPTICAL CHARACTER RECOGNITION EXTRACTED DATA, AND ENTERPRISE RESOURCE PLANNING DATA

BACKGROUND

The present invention relates to the reconciliation of business document image data with data from a business information management (BIM) system such as an enterprise resource planning (ERP) system. More specifically, one embodiment of the invention relates to a one-screen reconciliation of a document or a document image, optical character recognition (OCR) extracted data, and ERP data.

Reconciliation of document image data with data from an ERP system is currently carried out using multiple screens. A first screen displays document data fields extracted by an OCR engine. The extraction of document data fields and the correction of extracted document data fields must occur in the first screen. A second screen is linked to an ERP system. The application of business checks necessary to complete the processing of a business document must occur in the second screen. If errors are found that require additional OCR extraction, a user must switch between the first and second screens until all extracted document data can be reconciled with the ERP system.

SUMMARY

A one-screen approach to reconciliation of a business document image, OCR extracted data, and ERP data is desirable because such an approach can save the user time and allow for a higher degree of automation.

In one embodiment, the invention provides a method of reconciling information from a document or a document image. A document may be exist as a PDF or text file or file in another format. A document image may be obtained, for example, by scanning a paper document to create an electronic document image. A set of data is extracted from the document image using OCR. In the case where a document exists in a text file or similar format, data may be extracted using a string search or by using a virtual printer technique. To use a virtual printer, a print command is executed on a text document to generate a data stream. Instead of sending the data stream to a printer, the data stream is sent to an extractor (e.g., a software engine) and data from the document is extracted from data stream. The set of extracted data is placed in an extracted data pane. The data in the extracted data pane is then compared to data in a business information management (BIM) system, such as an ERP system. The data in the ERP system that matches the extracted data is retrieved and placed in the ERP data pane. The ERP data is automatically assigned to the corresponding extracted data in the extracted data pane to create a set of assigned data. The ERP data from the ERP data pane is then moved into the data pane to complete the assignment of data. The document image, extracted data, and the ERP data are displayed simultaneously in the business document image pane, extracted data pane, and ERP data pane, respectively. Further, the document image, extracted data, and ERP data are displayed in the same window. The set of assigned data is then validated. The assigned data is checked for missing or incorrect extracted data fields and for missing or incorrect ERP data fields. If extracted data is missing or incorrect, a user can manually extract the necessary document data to complete the assignment. If ERP data is missing or incorrect, the user can manually solve any exceptions. If any other errors in assignment occur, the user can manually reconcile the business document data. After the set of assigned data has been validated, the ERP system is updated with the set of assigned data.

In another embodiment, the invention provides a method of reconciling information from a digital image. A set of digital data is extracted from the digital image using OCR. The set of OCR extracted data is placed in an OCR data pane. A set of BIM data related to the set of OCR extracted data is retrieved from a BIM system. The BIM data is automatically assigned to the corresponding OCR extracted data to create a set of assigned data. The digital image, OCR extracted data, and the BIM data are displayed simultaneously in a digital image pane, OCR data pane, and BIM data pane, respectively. Further, the digital image, OCR extracted data, and BIM data are displayed in the same window. The set of assigned data is then validated. The assigned data is checked for missing or incorrect OCR extracted data fields and for missing or incorrect BIM data fields. If OCR extracted data is missing or incorrect, a user can manually extract the necessary digital data to complete the assignment. If BIM data is missing or incorrect, the user can manually solve any exceptions. If any other errors in assignment occur, the user can manually reconcile the digital data. After the set of assigned data has been validated, the BIM system is updated with the set of assigned data.

In another embodiment, the invention includes a one-screen system for reconciliation of a document image, extracted data, and ERP data. The system includes a BIM system, a user input device; a monitor; and a computer configured to communicate with or be connected to the user input device, the monitor, and BIM system. In one embodiment, the computer is configured to receive or obtain a document; extract a set of data from the document to create a set of extracted data; compare the set of extracted data with data from the BIM system; retrieve a set of BIM data related to the set of extracted data; and assign the set of BIM data to the set of extracted data to create a set of assigned data. The computer is also configured to generate one or more signals to display the document in a document image pane; generate one or more signals to display the set of extracted data in an extracted data pane; and generate one or more signals to display the set of BIM data in a BIM data pane. The computer is further configure to validate the assignment of the set of BIM data to the set of extracted data to create a validated set of assigned data; and update the BIM system with the validated set of assigned data.

Other aspects of the invention will become apparent by consideration of the detailed description and accompanying drawings.

BRIEF DESCRIPTION OF THE DRAWINGS

FIG. 5 illustrates an embodiment of a one-screen reconciliation window.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The following conceptual framework is helpful in understanding the broad scope of the invention, and the terms defined below have the indicated meanings throughout this application, including the claims.

The term "monitor" refers to a piece of equipment (such as a CRT or LCD) that displays viewable images based on signals generated by a source of video signals such as a computer.

The term "reconciliation" is the process of extracting a set of data from a document, matching the set of extracted data with a set of stored data in a data system, assigning the set of stored data to the set of extracted data, and updating the data system with the assigned set of extracted data.

The term "screen" refers to the entire image displayed on a monitor at any one time. A "screen" may include multiple "windows."

The term "window" refers to a defined viewing area on a screen such as a scrollable viewing area. Windows are often rectangular boxes that include one or more graphical mechanisms that can be selected or manipulated with a cursor-control device (such as a mouse) so that the window can be moved and resized.

The term "pane" refers to a distinct section of a window.

Figure 1:
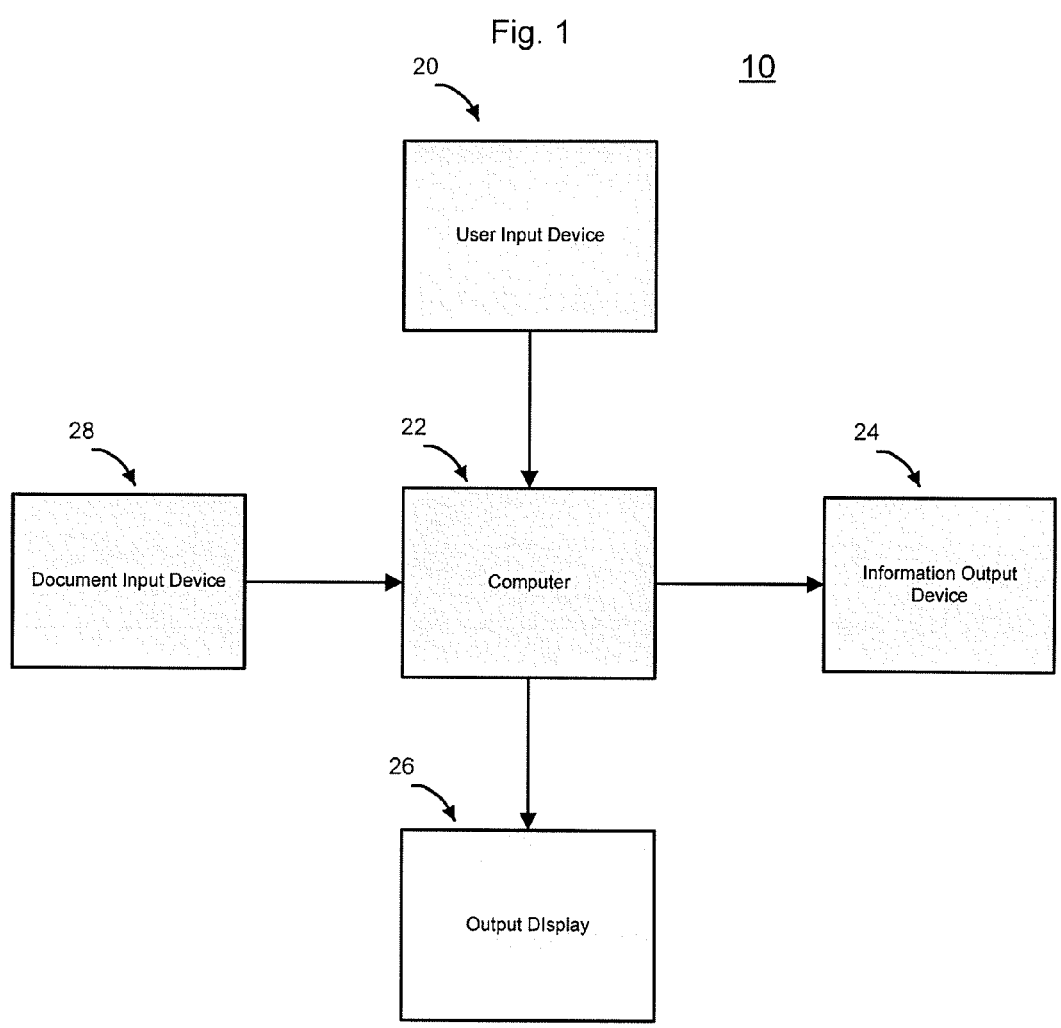
FIG. 1 illustrates an exemplary document processing system.

FIG. 1 illustrates a general embodiment of a document processing system 10. The document processing system includes a user input device 20, a computer 22, an information output 24, an output display 26, and a document input device 28.

The computer 22 can include memory, a central processing unit (CPU), and an I/O unit for accepting system input information and sending system output information. The computer 22 is capable of running programs by executing computer instructions fetched from memory. The user input device 20 allows a user to control or access information in the computer 22. The document input device 28 captures information from documents (such as an image or OCR data) and transmits that data to the computer 22. The output display 26 displays information to the user. The information output device 24 sends information from the document processing system to other devices connected to the computer 22 via a network.

Figure 2:
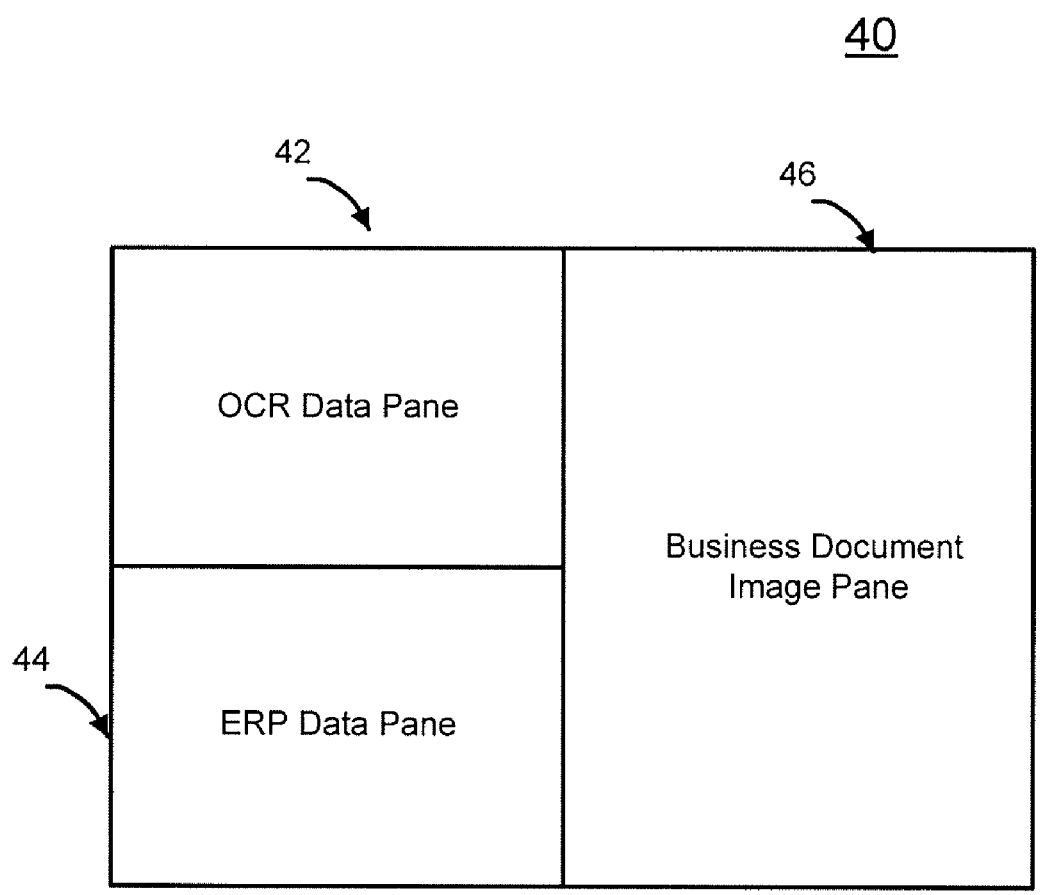
FIG. 2 illustrates an exemplary one-screen reconciliation window.

FIG. 2 illustrates an exemplary one-screen reconciliation window 40. In one embodiment, the one-screen reconciliation window 40 includes an extracted data pane, which in one embodiment is an optical character recognition (OCR) data pane 42. The window also includes a business information management (BIM) system data pane, which in the exemplary embodiment takes the form of an enterprise resource planning (ERP) data pane 44, and a document image pane or, in one embodiment, business document image pane 46.

As is known, an ERP system is, in general, an integrated software program or suite of software programs that provides data on many or all aspects of a business, such as manufacturing, finance, inventory, human resources, sales, etc. The objective of ERP software is to enable a business to monitor and control its overall operation.

The business document image pane 46 displays a document or document image such as a digital image created as the result of scanning a business document. A business document could be an invoice, order, bill, or other document used in conducting the affairs of a company or other business. The OCR data pane 42 displays one or more OCR extracted data fields from the business document image. The ERP data pane 44 displays data from an ERP system. In most embodiments, the data from the ERP system is matched to one or more OCR extracted data fields.

Figure 3:
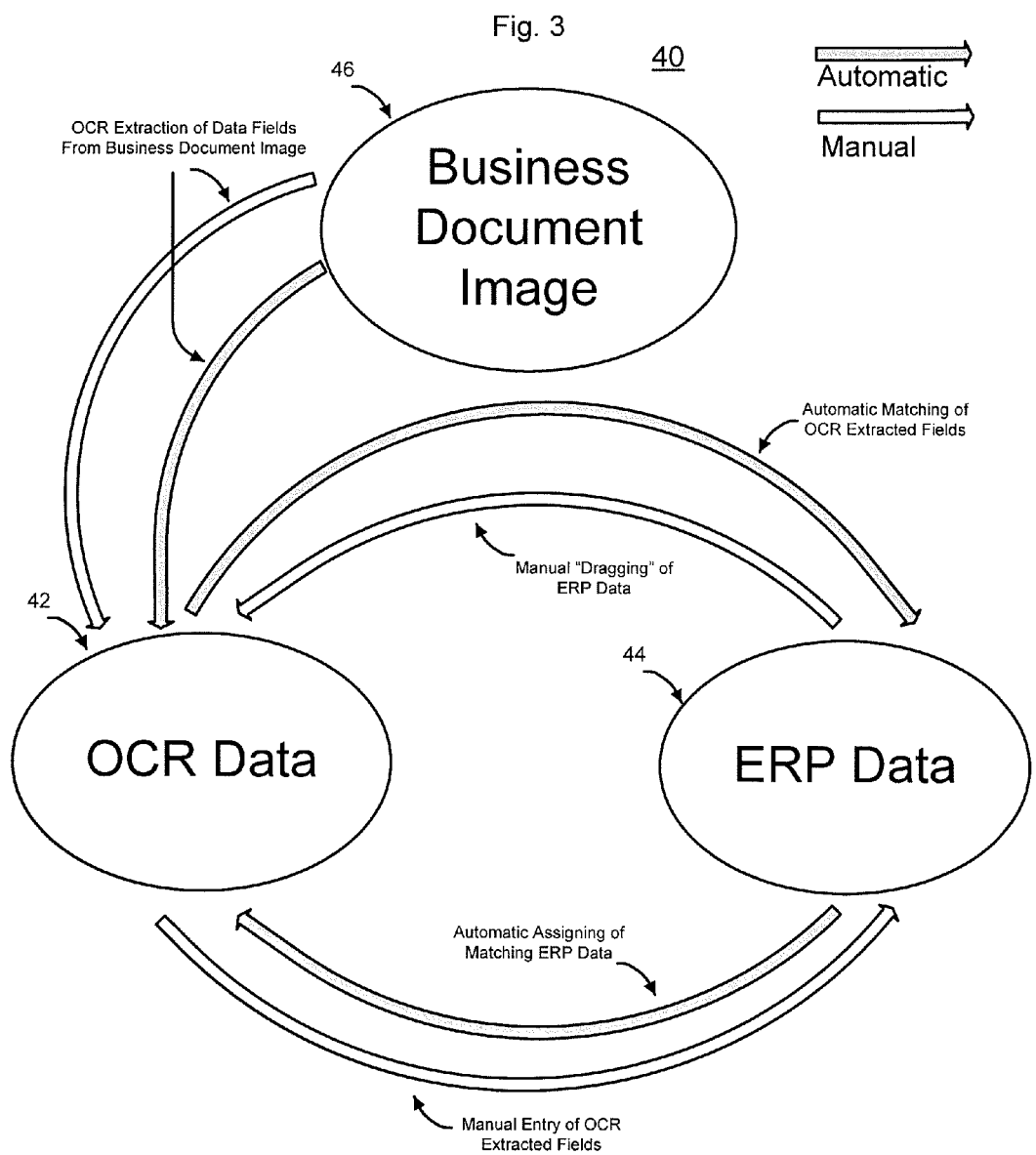
FIG. 3 illustrates information flow between the business document image pane, the OCR data pane, and the ERP data pane.

FIG. 3 illustrates how information flows between the OCR data pane 42, the ERP data pane 44, and the business document image pane 46. One or more data fields are extracted via OCR from the business document image in the business document image pane 46. The one or more OCR extracted data fields can be extracted either manually or automatically from the business document image. The OCR data pane 42 displays the OCR extracted data fields from the business document image. The OCR extracted data fields are matched against data in the ERP system. A set of matching ERP business data is displayed in the ERP data pane 44. The set of ERP business data in the ERP data pane 44 is automatically assigned to matching data in the OCR data pane 42. During automatic assignment, the ERP business data is automatically moved from the ERP data pane 44 to the OCR data pane 42. ERP business data from the ERP data pane 44 can also be manually dragged to the OCR data pane 42. Manually entering OCR extracted data fields into the ERP data pane 44 may be carried out if ERP system data cannot be found to match the OCR extracted data fields.

Figure 4:
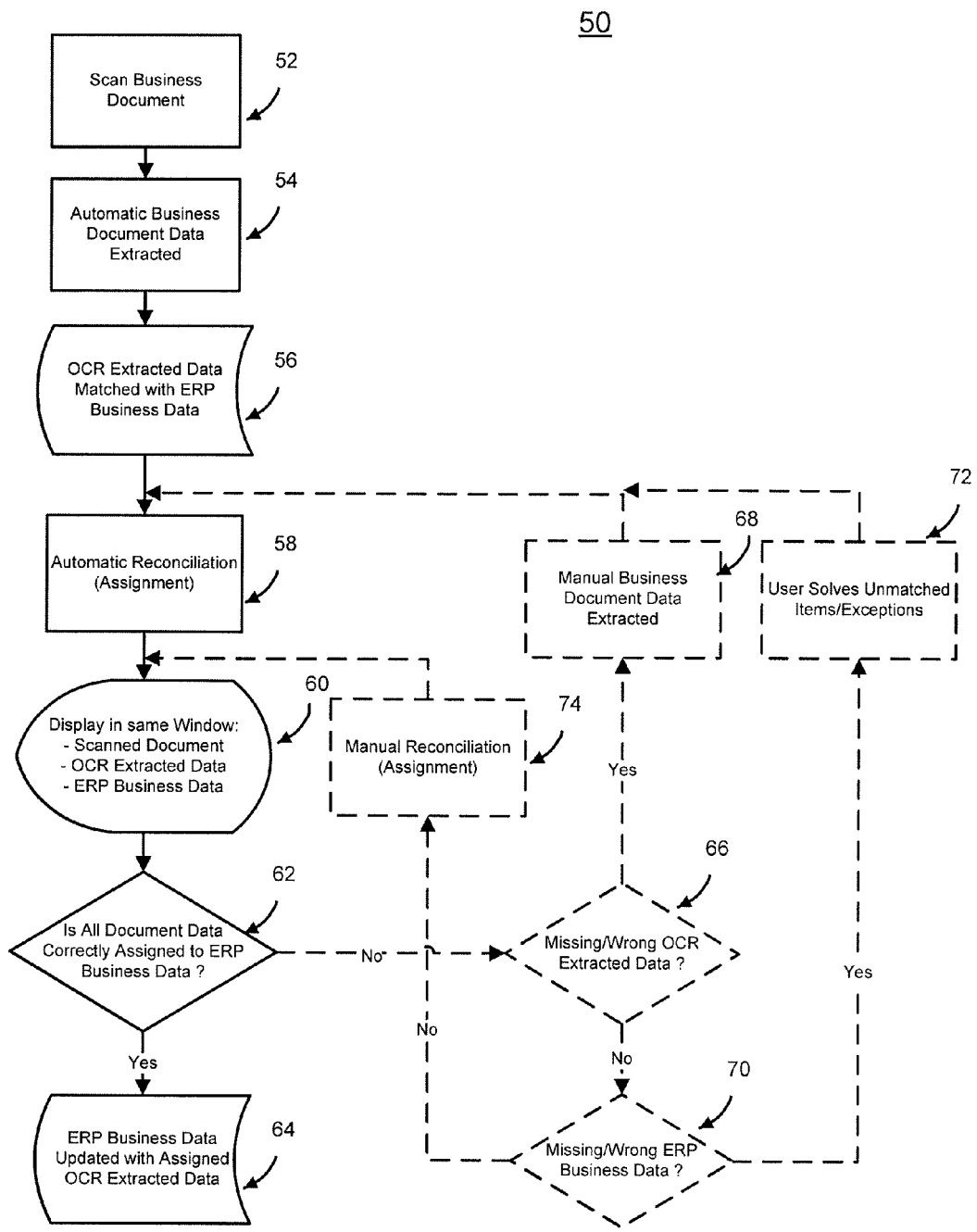
FIG. 4 illustrates an exemplary one-screen reconciliation process.

FIG. 4 illustrates a process 50 carried out by the computer 22. The process 50 begins when a business document is scanned to create a business document image (step 52). After the business document has been scanned, business document data is automatically extracted using OCR (step 54). After step 54, the OCR extracted data is automatically matched with ERP business data (step 56). The matched ERP business data is then automatically assigned to the corresponding OCR extracted data (step 58). The business document image, OCR extracted data, and the matched ERP business data are then displayed in the same window (step 60). If all ERP business data is correctly assigned to the OCR extracted data (step 62), the ERP system is updated with the validated set of assigned data (step 64).

Figure 5:
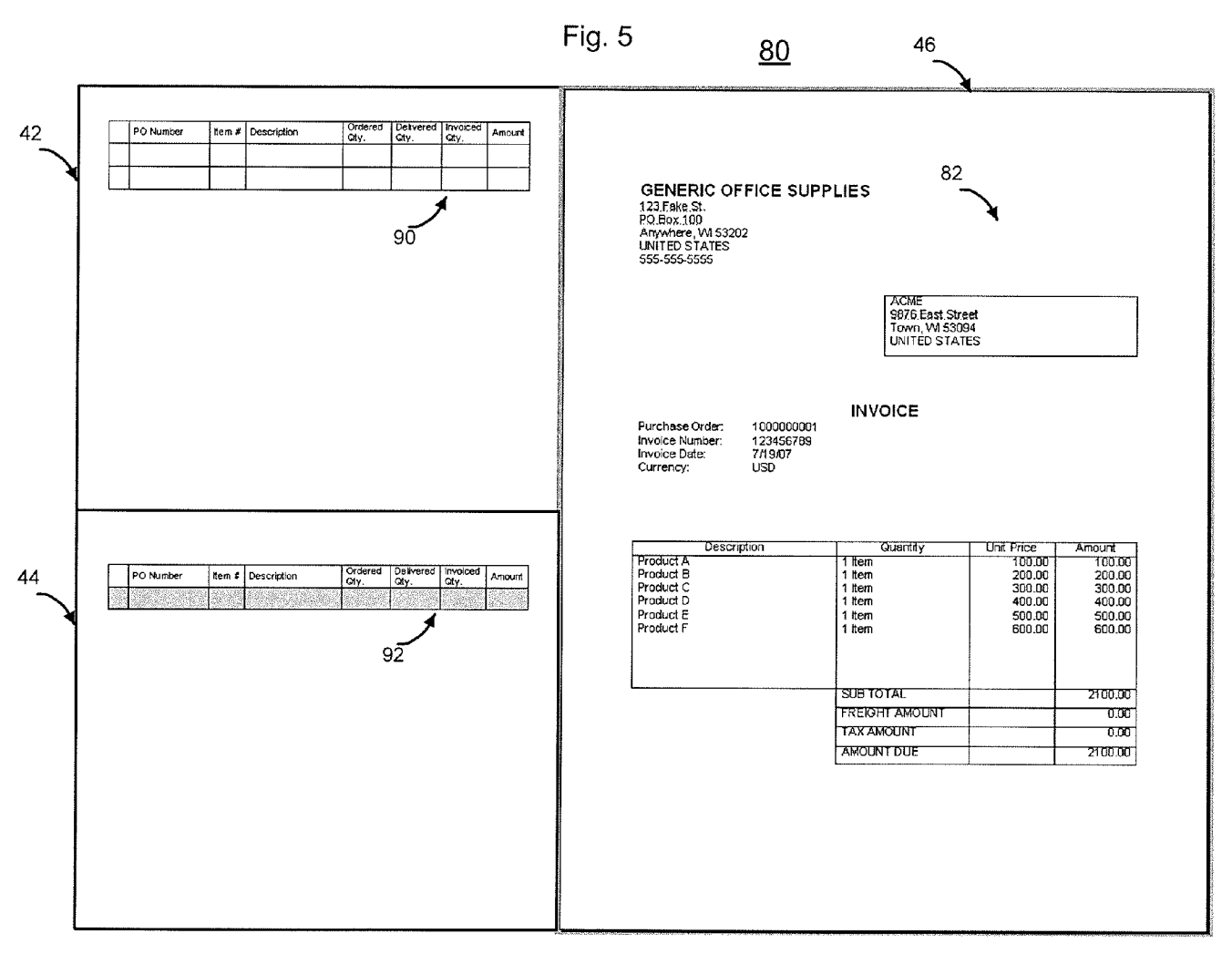

FIG. 5 illustrates an embodiment of a one-screen reconciliation window 80 that includes panes 42, 44, and 46. The business document image pane 46 includes a business document image 82. The OCR data pane 42 includes an OCR data table 90. The ERP data pane 44 includes an ERP data table 92.

Figure 6:
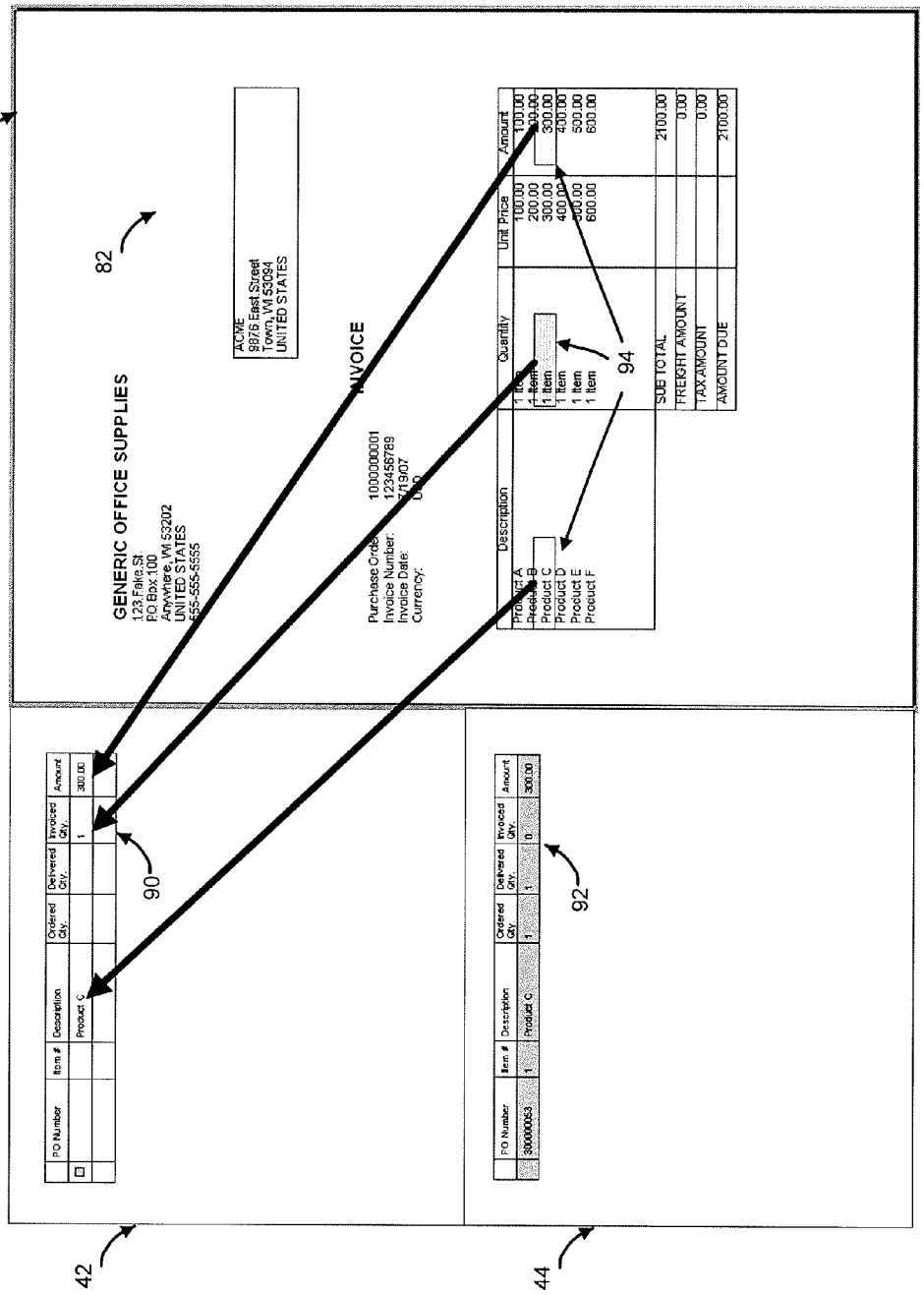
FIG. 6 illustrates extraction of a set of OCR extracted data from a business document image.

FIG. 6 illustrates the result of software executed by the computer 22 when the business document image 82 is encountered. The business document image 82 includes a set of extracted data fields 94. The set of extracted data fields 94 is extracted to the OCR data table 90 in the OCR data pane 42. Each extracted data field is placed in the OCR data table 90 column corresponding to the position of that field in the business document image 82. For example, the item description in the business document image 82 "Product C" is placed in the description column of the OCR data table 90 in the OCR data pane 42.

Figure 7:
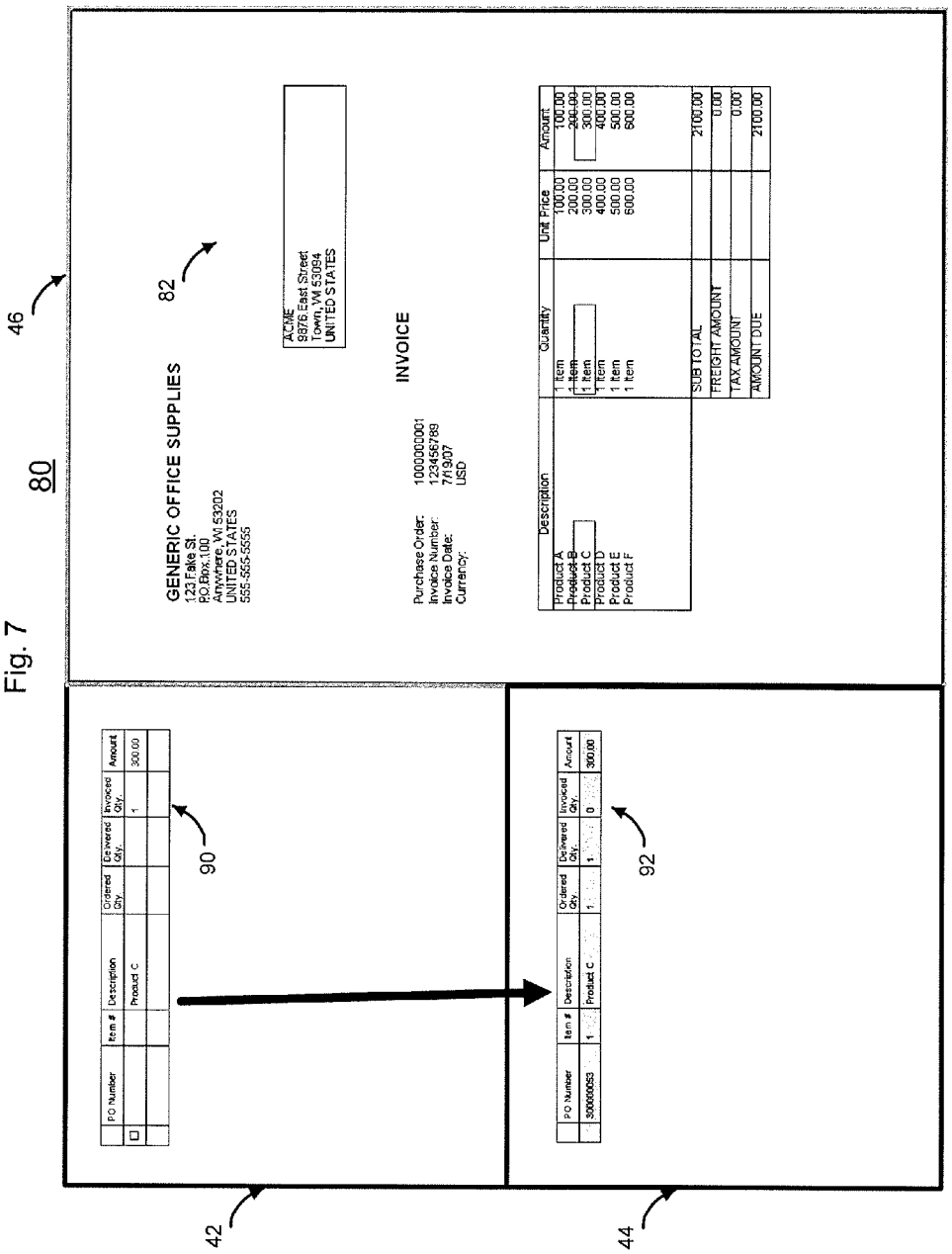
FIG. 7 illustrates actions carried out when OCR extracted data is compared to data in an ERP system.

FIG. 7 illustrates the result of software executed by the computer 22 following OCR extraction of data fields from the business document image. Extracted data fields such as company name (not shown) and purchase order number (not shown) are matched with ERP business data already in an ERP system. The matched ERP business data is displayed in the ERP data table 92 in the ERP business data pane 44.

Figure 8:
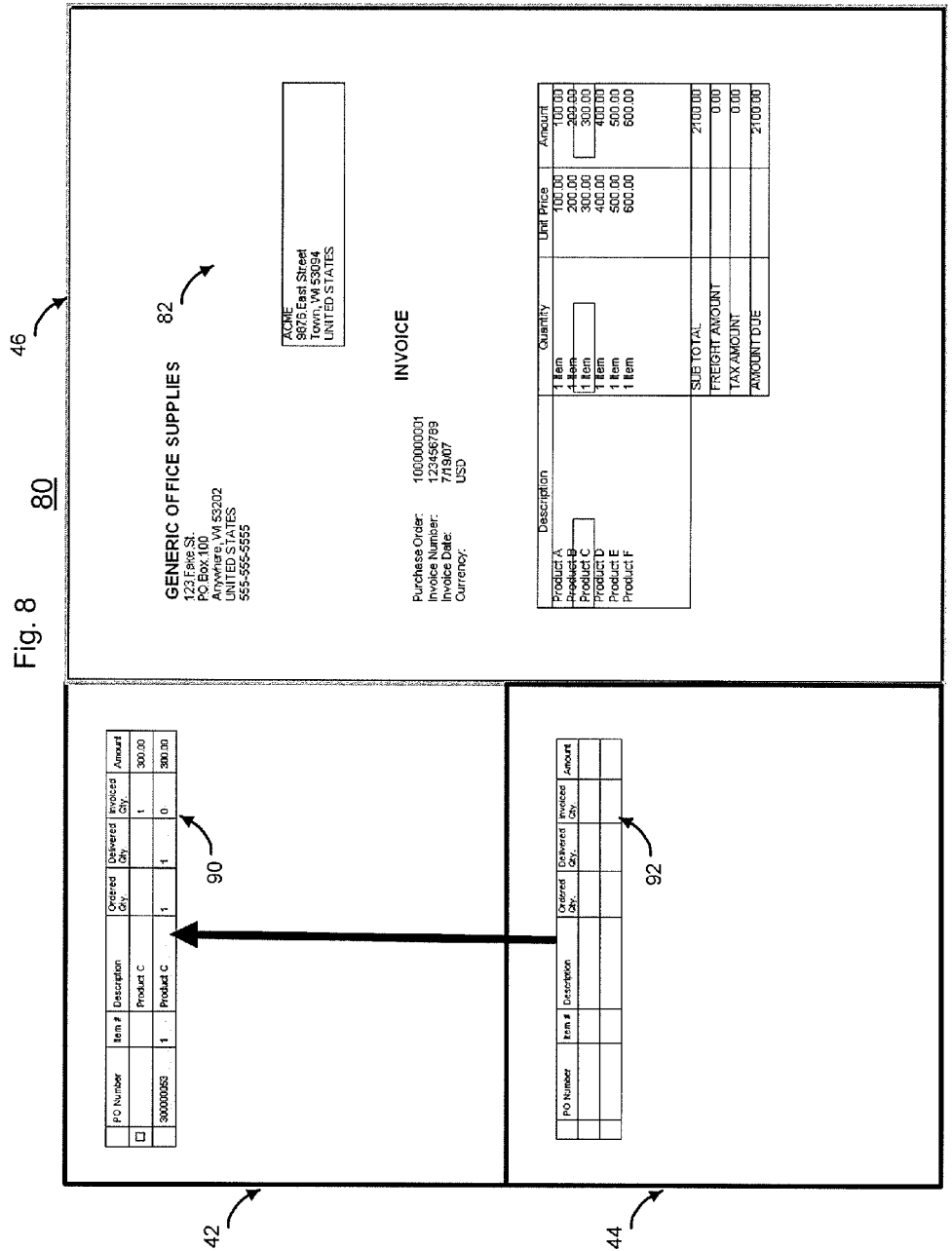
FIG. 8 illustrates actions carried out when ERP data is assigned to OCR extracted data.

FIG. 8 illustrates the result of software executed by the computer 22 following OCR extracted data being matched to ERP system data. The matched ERP data is assigned to the data in the OCR data table 90. If all OCR extracted data in the OCR data table 90 has been assigned to matching data from the ERP data pane 44, reconciliation is complete. The business document image 82, the OCR extracted data, and the ERP business data, are all displayed in the one-screen reconciliation window 80. If all ERP business data is correctly assigned to OCR extracted data, the ERP system is updated with the validated set of assigned data.

Figure 9:
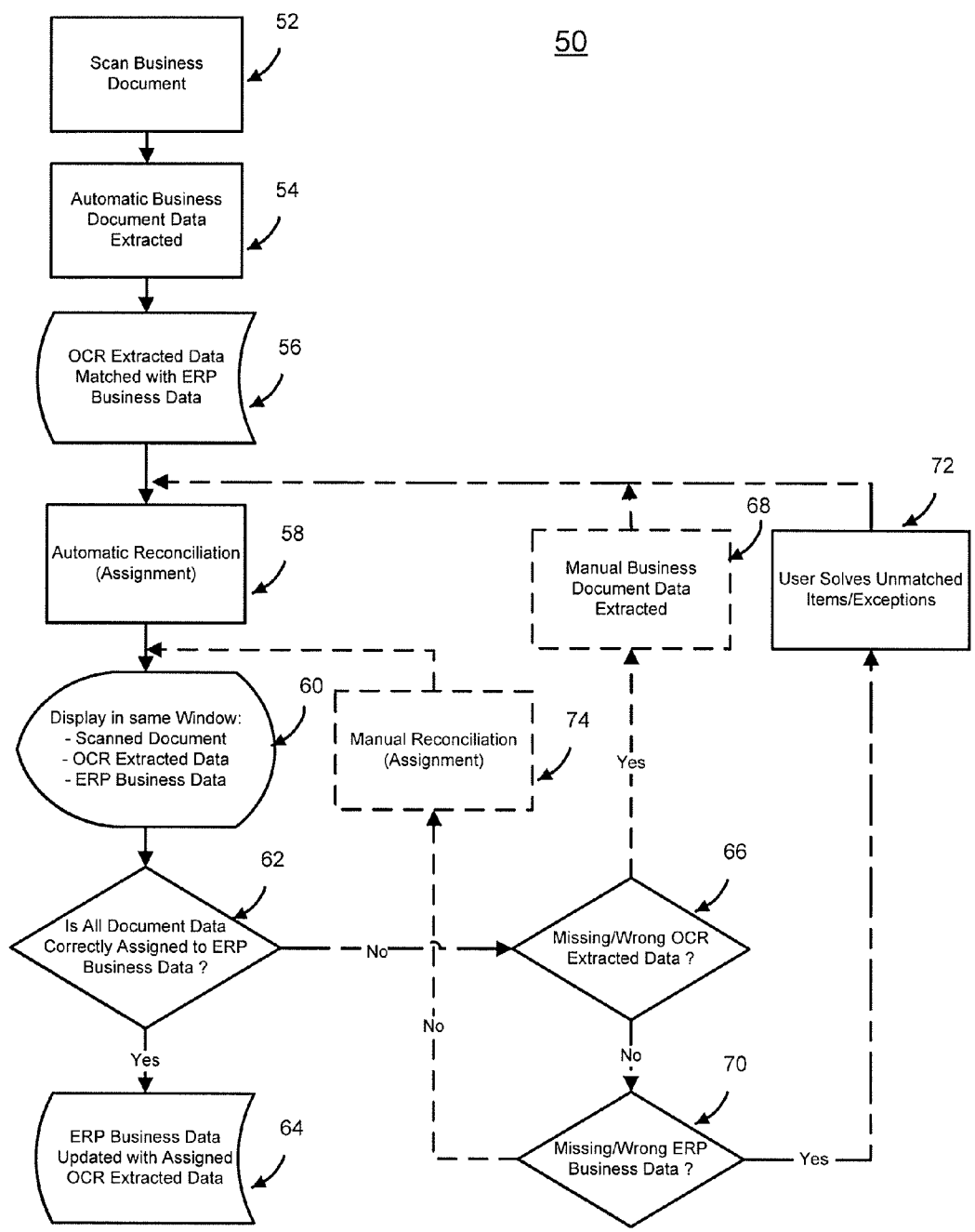
FIG. 9 illustrates an exemplary one-screen reconciliation process when there is missing or incorrect ERP data.

FIG. 9 illustrates the process 50 under circumstances where not all OCR extracted data has been correctly assigned. As with the situation described in FIG. 4, the process 50 begins when a business document is scanned to create a business document image (step 52). After the business document is scanned, business document data is automatically extracted using OCR (step 54). The OCR extracted data is then automatically matched with ERP business data (step 56). The matched ERP business data is then automatically assigned to the corresponding OCR extracted data (step 58). The business document image, OCR extracted data, and the matched ERP business data are displayed in the same window (step 60). If not all ERP business data is correctly assigned to OCR extracted data (step 62), further reconciliation is required. The user then verifies that no OCR extracted data is missing or incorrect (step 66). If no OCR extracted data is missing or incorrect, the user checks for missing or incorrect ERP business data (step 70). If ERP business data is missing or incorrect, the user manually solves unmatched items and exceptions (step 72). After step 72, the process 50 follows steps 58, 60, 62, and 64 as described with regard to FIG. 4.

Figure 10:
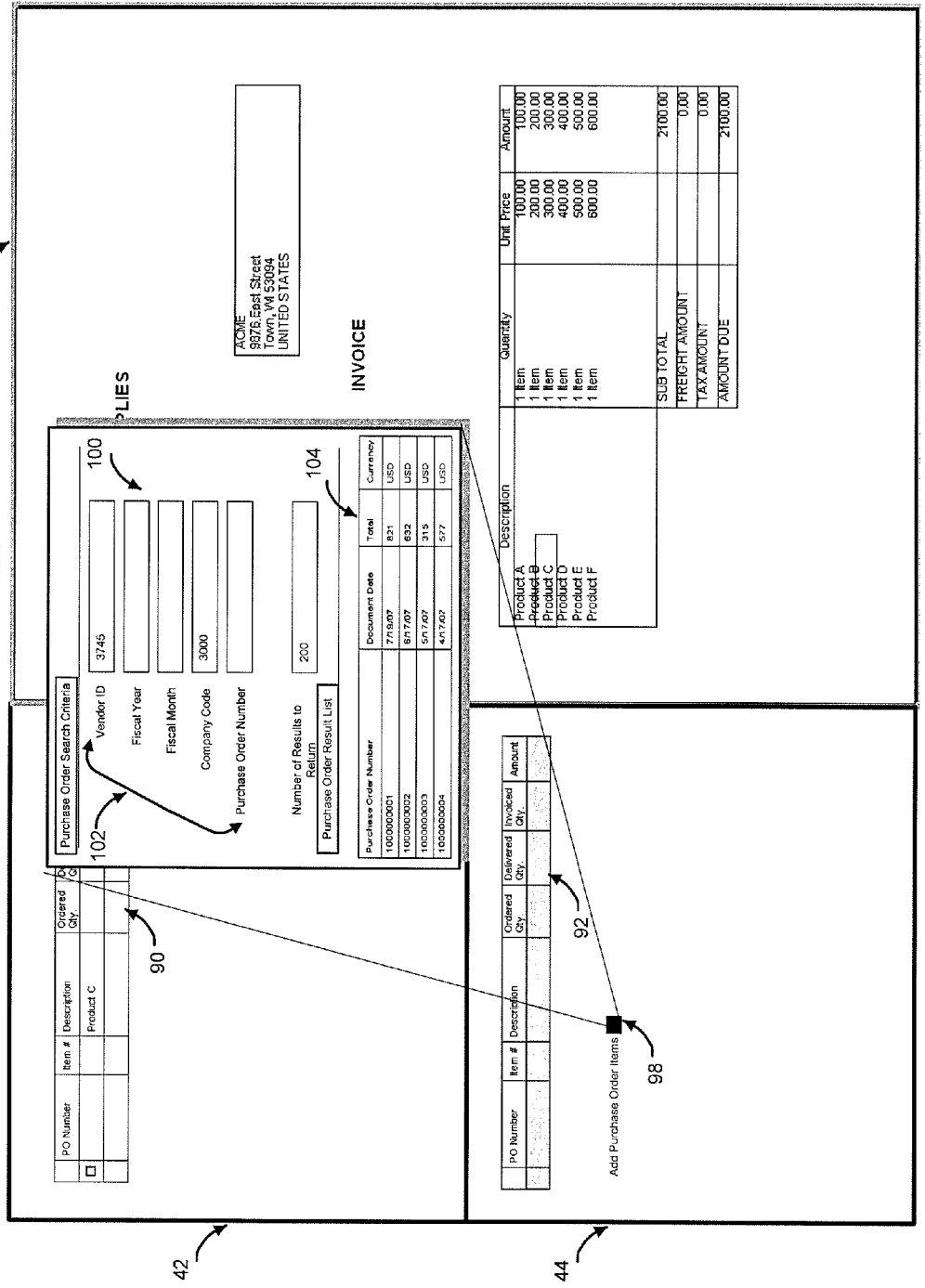
FIG. 10 illustrates actions carried out by the user to manually match OCR extracted data with ERP system data.

FIG. 10 illustrates actions carried out by the user if OCR extracted data in the OCR data table 90 cannot be automatically matched to corresponding ERP data in the ERP data table 92. The OCR extracted data cannot be matched to ERP data when OCR extracted data are missing or have no corresponding data in the ERP system. The user can select an add purchase order items button 98 to open an ERP search window 100. The ERP search window 100 enables the user to enter search criterion 102 (i.e., vendor ID, fiscal year, fiscal month, company code, purchase order number, etc.). After the ERP system is searched, ERP business data search results are displayed in a search results table 104. ERP search results can be added to the ERP data table 92 as needed. The ERP business data in the ERP data table 92 is then assigned to corresponding data in the OCR data table 90.

Figure 11:
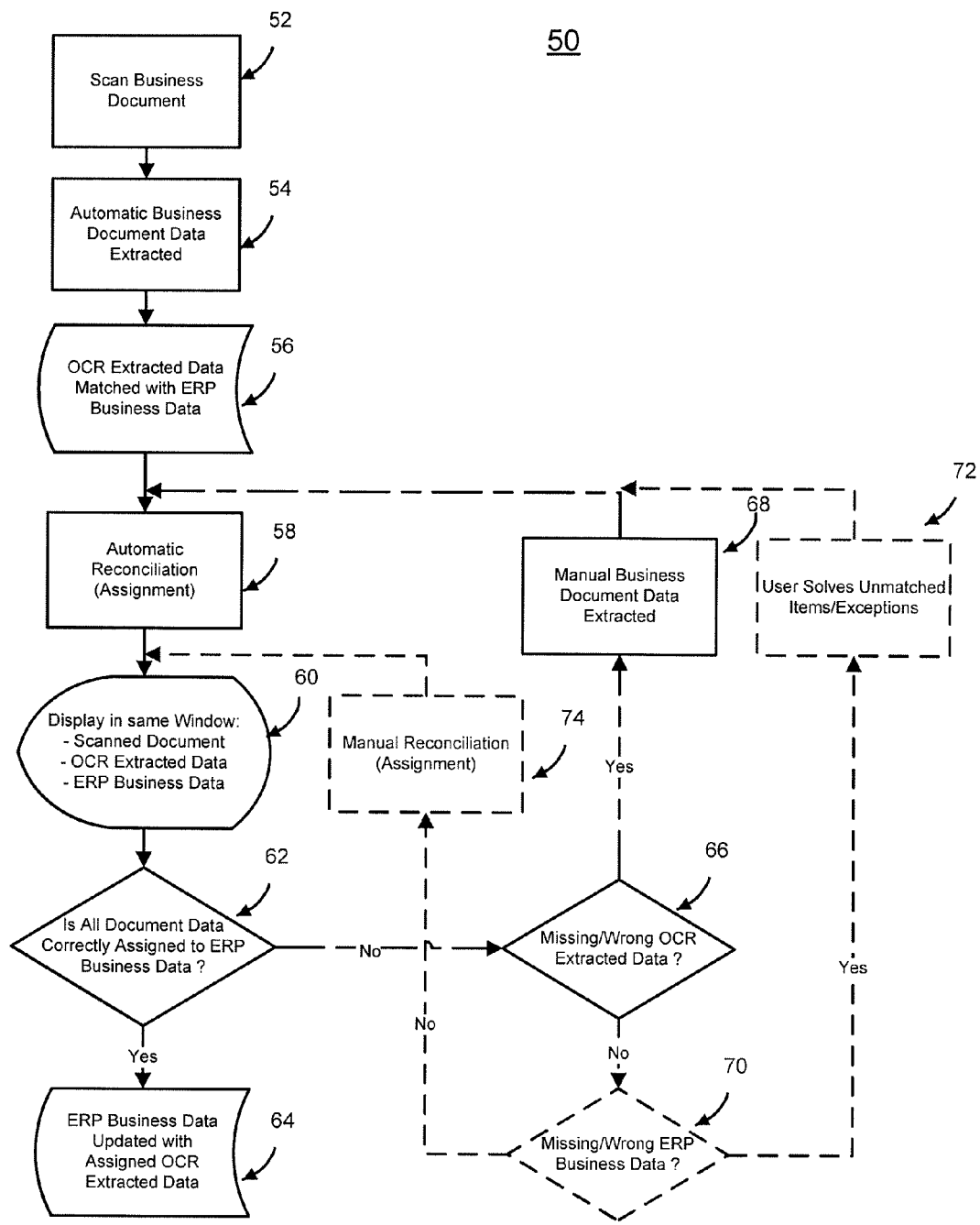
FIG. 11 illustrates an exemplary one-screen reconciliation process when there is missing or incorrect OCR extracted data.

FIG. 11 illustrates the process 50 under circumstances where not all OCR extracted data has been correctly assigned. As with the situation described in FIGS. 4 and 9, steps 52-56 are carried out. After step 56, matched ERP business data is automatically assigned to the corresponding OCR extracted data (step 58). After step 58, the business document image, OCR extracted data, and the matched ERP business data are displayed in the same window (step 60). If not all ERP business data is correctly assigned to OCR extracted data (step 62), further reconciliation is required. The user verifies that no OCR extracted data is missing or incorrect (step 66). If OCR extracted data is missing or incorrect, the user manually extracts business document data from the business document image (step 68). After step 68, the process 50 follows steps 58, 60, 62, and 64.

Figure 12:
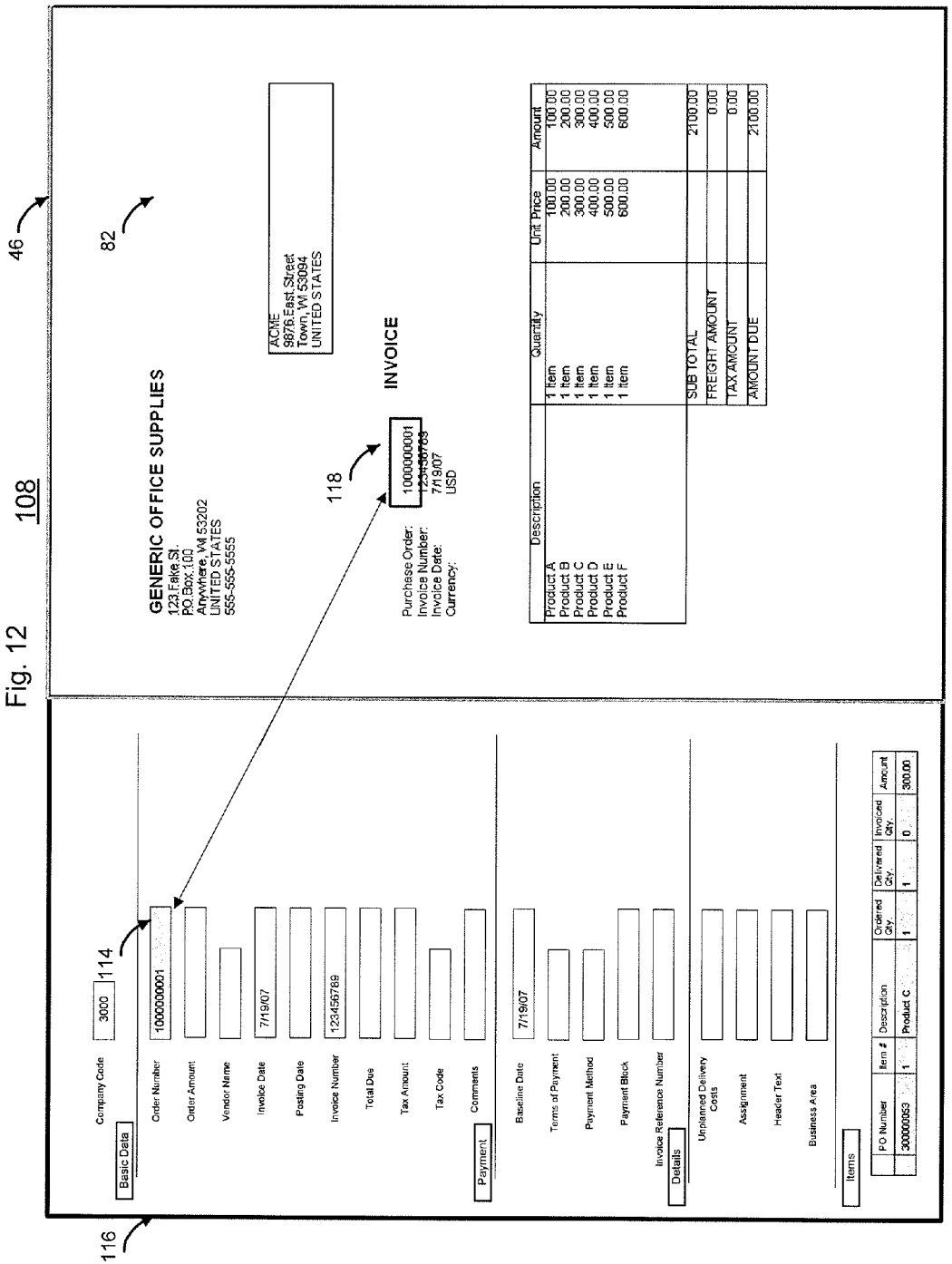
FIG. 12 illustrates actions carried out by the user when additional business document data must be manually extracted from the business document image.

FIG. 12 illustrates a window 108 and actions carried out by the user if additional business document data must be manually extracted from the business document image. As in FIG. 12, the business document image 82 is displayed in an image pane 46 adjacent to an invoice pane 116. The user selects the areas of the business document image needed to complete reconciliation. In the examples shown, the field selected for extraction is a purchase order field 118. An order number field 119 is highlighted in the invoice pane 116 by, for example, using a mouse or cursor-control device. Manual extraction of business document data can be performed until all necessary information has been extracted. A user can also extract a longer string of text. For example, the "comments" field of the invoice pane can be highlighted and the longer text string can be extracted. The longer string of text may include multiple words, letters, numbers, or symbols.

Figure 13:
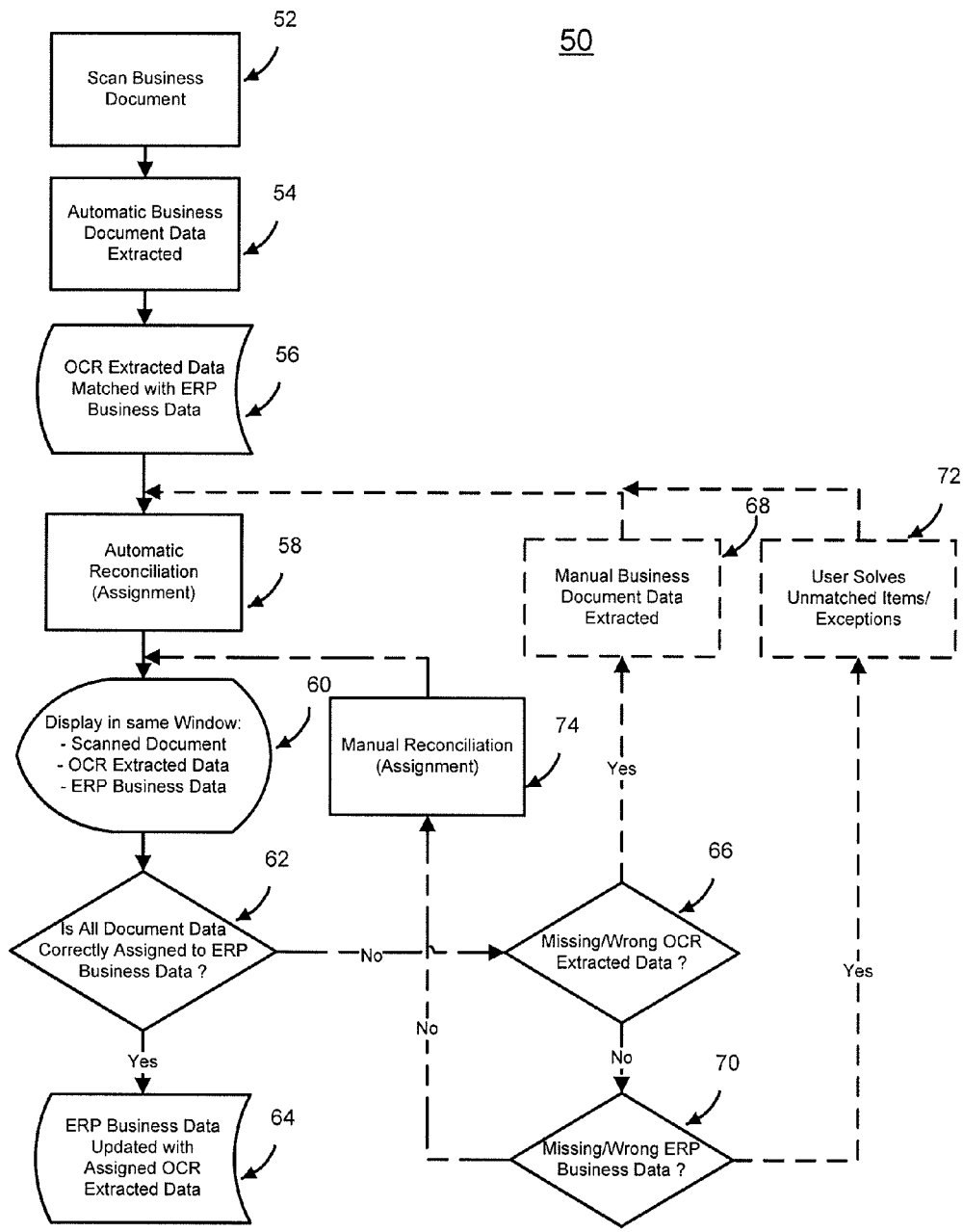
FIG. 13 illustrates an exemplary one-screen reconciliation process when assigned data cannot be validated and there is no missing or incorrect ERP data.

FIG. 13 illustrates the process 50 under circumstances where not all OCR extracted data has been correctly assigned. As with the situation described in FIGS. 4, 9 and 11, steps 52-58 are carried out. After step 58, the business document image, OCR extracted data, and the matched ERP business data are displayed in the same window (step 60). If not all ERP business data is correctly assigned to OCR extracted data (step 62), further reconciliation is carried out. The user verifies that no OCR extracted data is missing or incorrect (step 66). If no OCR extracted data is missing or incorrect, the user checks for missing or incorrect ERP business data (step 70). If no OCR extracted data is missing or incorrect, the user manually assigns the matching ERP business data to the corresponding OCR extracted data (step 74). Manual assignment of matching ERP business data to the corresponding OCR extracted data involves dragging ERP business data from the ERP data pane 44 to the corresponding OCR extracted data in the OCR data pane. After step 74, the process 50 follows steps 60, 62, and 64 as described with regard to FIG. 4.

The description provided above has focused on circumstances where OCR extraction of data is carried out. However, as previously indicated, when text files are available, OCR extraction is not necessary and it is possible to extract data from a document by using a virtual printer technique, where data from a print driver is processed rather than being sent to an actual printer. When a print command is executed, a data stream is generated. Generally, such a data stream conforms to a predetermined protocol such as the one defined by printer command language (PCL). Rather than extracting data from the document using OCR, when a text or similar file is available, a set of data can be extracted from the PCL data stream that is output from a printer driver or similar module in a word processing program.

As can be seen from all of the above, embodiments of the invention provide, among other things, document reconciliation systems and methods in which a document or document image, extracted data, and ERP or business data can be examined in a single screen.

Various features and advantages of the invention are set forth in the following claims.

What is claimed is:

1. A machine-implemented method of reconciling data from an imaged business document, the method comprising:
    scanning a business document with a scanner to create a business document image;
    extracting a set of data from the business document image using optical character recognition to create a set of optical character recognition extracted data, the set of optical character recognition extracted data including at least one optical character recognition extracted data field;
    comparing the at least one optical character recognition extracted data field with data from a business information management system;
    automatically matching, based on the comparison, a set of business information management data to the at least one optical character recognition extracted data field to create a set of matched business information management data;
    retrieving the set of matched business information management data from the business information management system;
    assigning, based on the automatic matching, the retrieved set of matched business information management data to the at least one optical character recognition extracted data field to create a set of assigned data, the set of assigned data including the at least one optical character recognition extracted data field and the retrieved set of matched business information management data;
    displaying the business document image in a business document image pane generated on a display;
    displaying the set of optical character recognition extracted data in an optical character recognition data pane generated on the display;
    displaying the retrieved set of matched business information management data in a business information management data pane generated on the display;
    moving the set of assigned data from the business information management data pane to the optical character recognition data pane,
    wherein the business document image, the optical character recognition extracted data, and the business information management data are displayed simultaneously in a window of the display;
    validating the assignment of the set of business information management data to the at least one optical character recognition extracted data field to create a validated set of assigned data; and
    updating the business information management system with the validated set of assigned data.

2. The method as claimed in claim 1, further comprising:
    checking for one or more missing optical character recognition extracted data fields;
    checking for one or more incorrect optical character recognition extracted data fields;
    checking for one or more missing business information management data fields; and
    checking for one or more incorrect business information management data fields.

3. The method as claimed in claim 1, further comprising: displaying each of the document image pane, the optical character recognition data pane, and the business information management data pane in the window of the display.

4. The method as claimed in claim 3, further comprising: graphically displaying irreconcilable optical character recognition extracted data fields; and
    extracting additional optical character recognition extracted data from the document image.

5. The method as claimed in claim 4, further comprising: extracting additional optical character recognition extracted data in response to a user input.

6. A system for reconciling data from a business document with data in a business information management system, the system comprising:
    a user input device;
    a monitor;
    a computer connected to the user input device and the monitor, the computer configured to communicate with the business information management system;
    receive a business document;
    extract a set of data from the business document to create a set of extracted data, the set of extracted data including at least one extracted data field;
    compare the at least one extracted data field with data from the business information management system;
    automatically match, based on the comparison, a set of business information management data to the at least one extracted data field to create a set of matched business information management data;
    retrieve the set of matched business information management data;
    assign, based on the automatic matching, the retrieved set of matched business information management data to the at least one extracted data field to create a set of assigned data, the set of assigned data including the at least one extracted data field and the retrieved set of matched business information management data;
    generate one or more signals to display the business document in a document image pane;
    generate one or more signals to display the set of extracted data in an extracted data pane;
    generate one or more signals to display the retrieved set of matched business information management data in a business information management data pane;
    move the set of assigned data from the business information management data pane to the extracted data pane;
    validate the assignment of the retrieved set of matched business information management data to the at least one extracted data field to create a validated set of assigned data; and
    update the business information management system with the validated set of assigned data,
    wherein the computer is configured to display the document image pane, the extracted data pane, and the business information management data panes simultaneously in a single window of the monitor.

7. The system as claimed in claim 6, wherein the computer is configured to extract the set of data using optical character recognition extraction.

8. The system as claimed in claim 6, wherein the computer is configured to:
    graphically display irreconcilable extracted data fields; and
    extract additional extracted data from the business document.

9. The system as claimed in claim 8, wherein the computer is configured to extract additional extracted data in response to a user input.

10. A method of reconciling data from a business document, the method comprising:
- extracting a set of data from a business document to create a set of extracted data, the set of extracted data including at least one extracted data field;
- comparing the set of extracted data with data from a business information management system;
- automatically matching a set of business information management data to the at least one extracted data field to create a set of matched business information management data;
- retrieving the set of matched business information management data;
- assigning the retrieved set of matched business information management data to the at least one extracted data field to create a set of assigned data, the set of assigned data including the at least one extracted data field and the retrieved set of matched business information management data;
- displaying the business document in a document image pane located within a window;
- displaying the set of extracted data in an extracted data pane located within the window simultaneously with the document image pane;
- displaying the retrieved set of matched business information management data in a business information management data pane located within the window simultaneously with the document image pane and the extracted data pane;
- validating the assignment of the retrieved set of matched business information management data to the at least one extracted data field to create a validated set of assigned data;
- updating the business information management system with the validated set of assigned data;
- moving the set of assigned data from the business information management data pane to the extracted data pane;
- graphically displaying irreconcilable extracted data fields; and
- extracting additional extracted data from the business document.

11. The method as claimed in claim 10, further comprising:
- checking for one or more missing extracted data fields;
- checking for one or more incorrect extracted data fields;
- checking for one or more missing business information management data fields; and
- checking for one or more incorrect business information management data fields.

* * * * *